United States Patent [19]

Perrier

[11] Patent Number: 5,222,716
[45] Date of Patent: Jun. 29, 1993

[54] FLOW CONTROL DEVICE

[76] Inventor: Rene Perrier, 91 Rue Fernand Lafont, 07160 Le Cheylard, France

[21] Appl. No.: 777,360
[22] PCT Filed: Apr. 10, 1991
[86] PCT No.: PCT/FR91/00294
 § 371 Date: Dec. 6, 1991
 § 102(e) Date: Dec. 6, 1991
[87] PCT Pub. No.: WO91/15691
 PCT Pub. Date: Oct. 17, 1991

[30] Foreign Application Priority Data

Apr. 11, 1990 [FR] France ................. 90 04654

[51] Int. Cl.⁵ ........................................... F16K 31/00
[52] U.S. Cl. ........................................ 251/348; 251/347
[58] Field of Search ..................... 251/340, 347, 348

[56] References Cited

U.S. PATENT DOCUMENTS

| 300,643 | 6/1884 | Rogers | 251/347 |
| 792,789 | 6/1905 | Casey | 251/340 |
| 903,451 | 11/1908 | Clark | 251/347 |
| 1,380,950 | 6/1921 | Fornwalt | 251/340 |
| 1,883,960 | 11/1932 | Koppel et al. | 251/340 |
| 2,369,356 | 2/1945 | Koehn | 251/340 |
| 2,576,334 | 11/1951 | Paasche | 251/347 |
| 3,941,410 | 3/1976 | Miyaoka | 285/321 |
| 3,987,999 | 10/1976 | Savage | 251/340 |
| 4,544,133 | 10/1985 | Collins | 251/348 |

FOREIGN PATENT DOCUMENTS

| 35200/89 | 12/1989 | Australia . | |
| 889392 | 9/1953 | Fed. Rep. of Germany | 137/862 |
| 2098782 | 3/1972 | France . | |
| 324087 | 10/1957 | Switzerland . | |

Primary Examiner—A. Michael Chambers
Attorney, Agent, or Firm—Young & Thompson

[57] ABSTRACT

A flow control device has two half-bodies (76, 79) connected to one another with the interposition of an annular seal (92) and forming together a body defining a flowpath (81) between two openings (82, 83), each of which is associated with one of the half-bodies. A closure (86) is mounted in the flowpath (81) for movement between a closed position, in which it is applied against a seat (87) formed on a first half-body (76), and an open position in which it is distant from its seat. The closure (86) is mounted between the seat (87) and the opening (82) of the first half-body (76) and is connected to the second half-body by a rod (88) that passes through the annular seal (92). The annular seal (92) is axially compressible. The flowpath (81) is outwardly bounded by the seal (92).

11 Claims, 6 Drawing Sheets

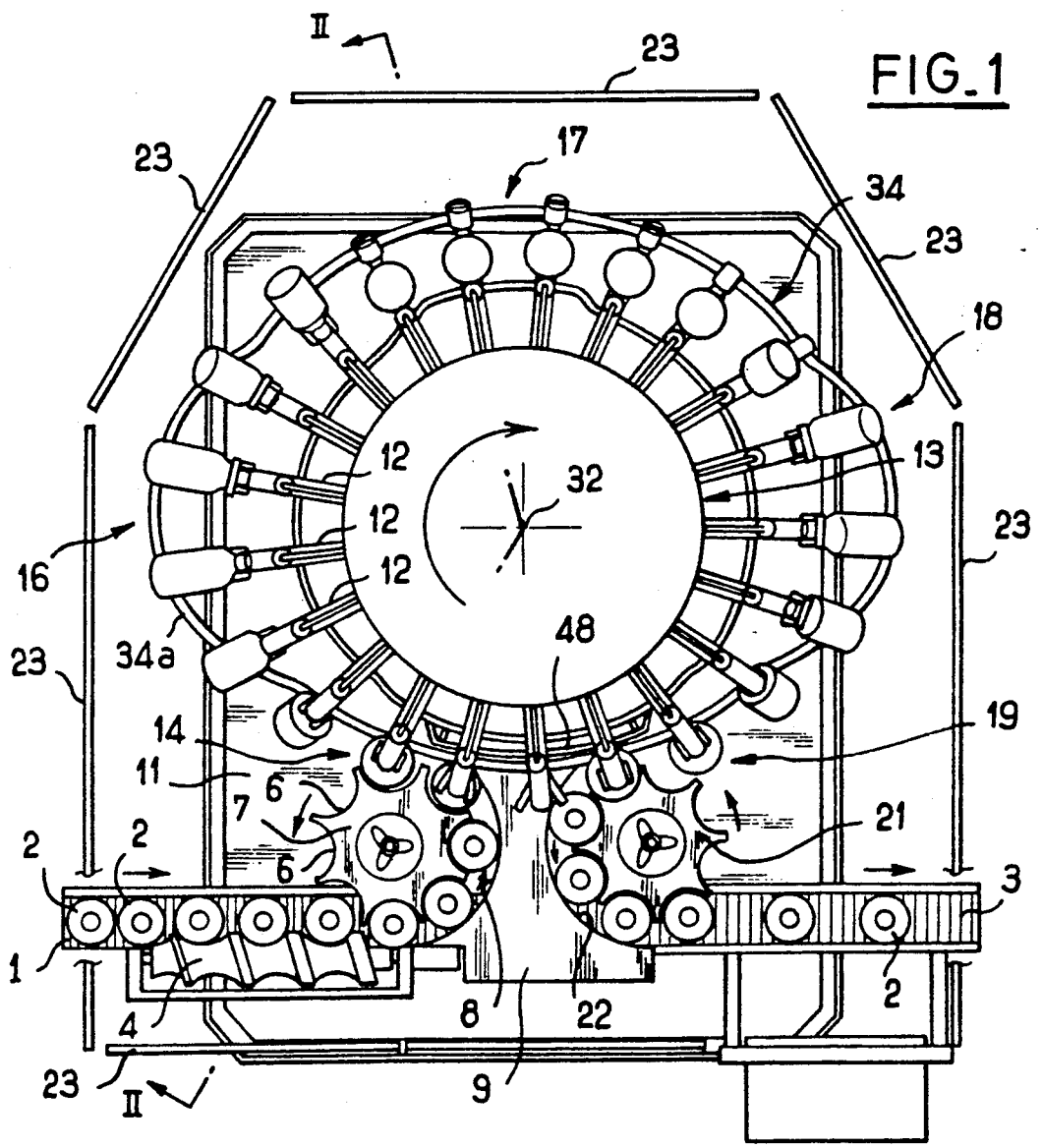
FIG_1
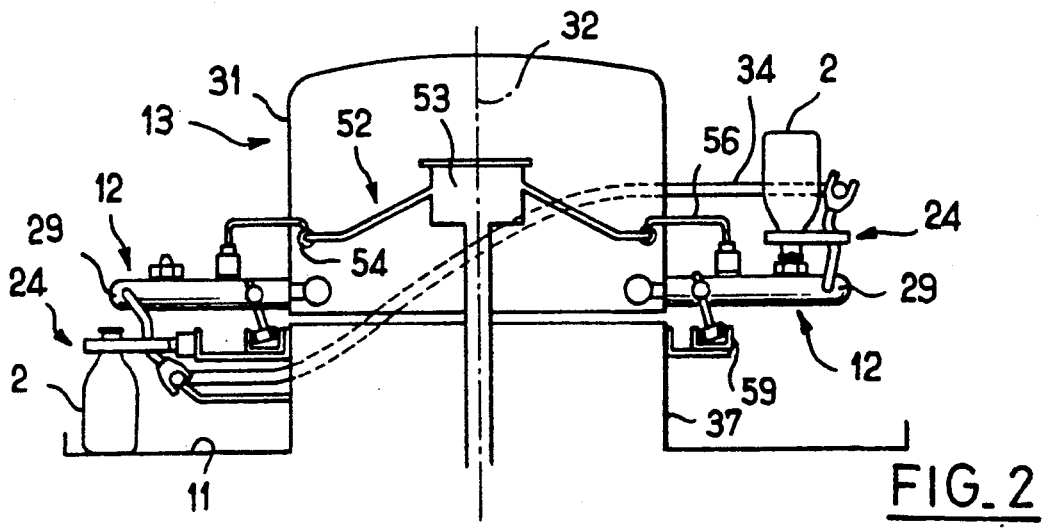
FIG_2

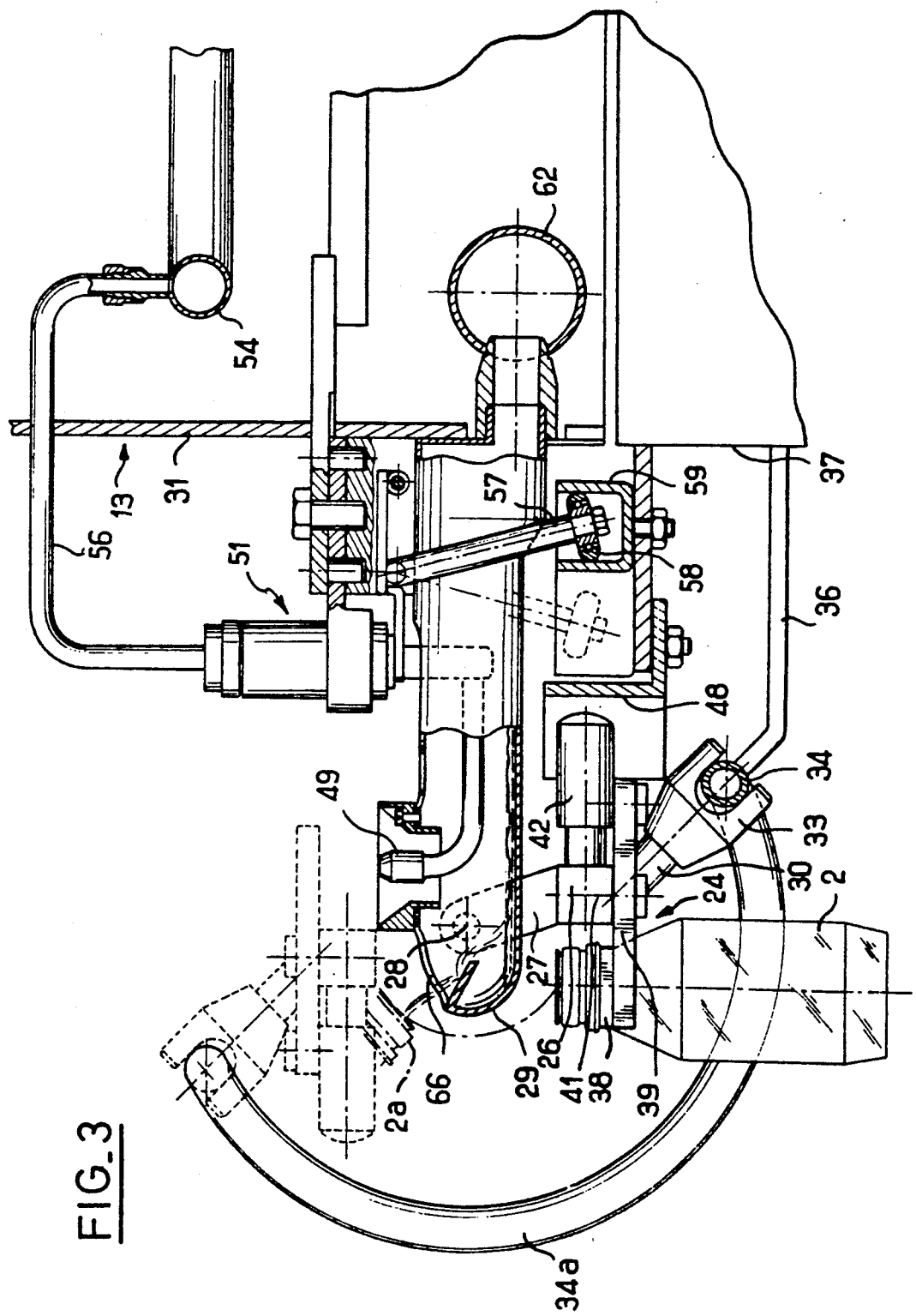
FIG_3

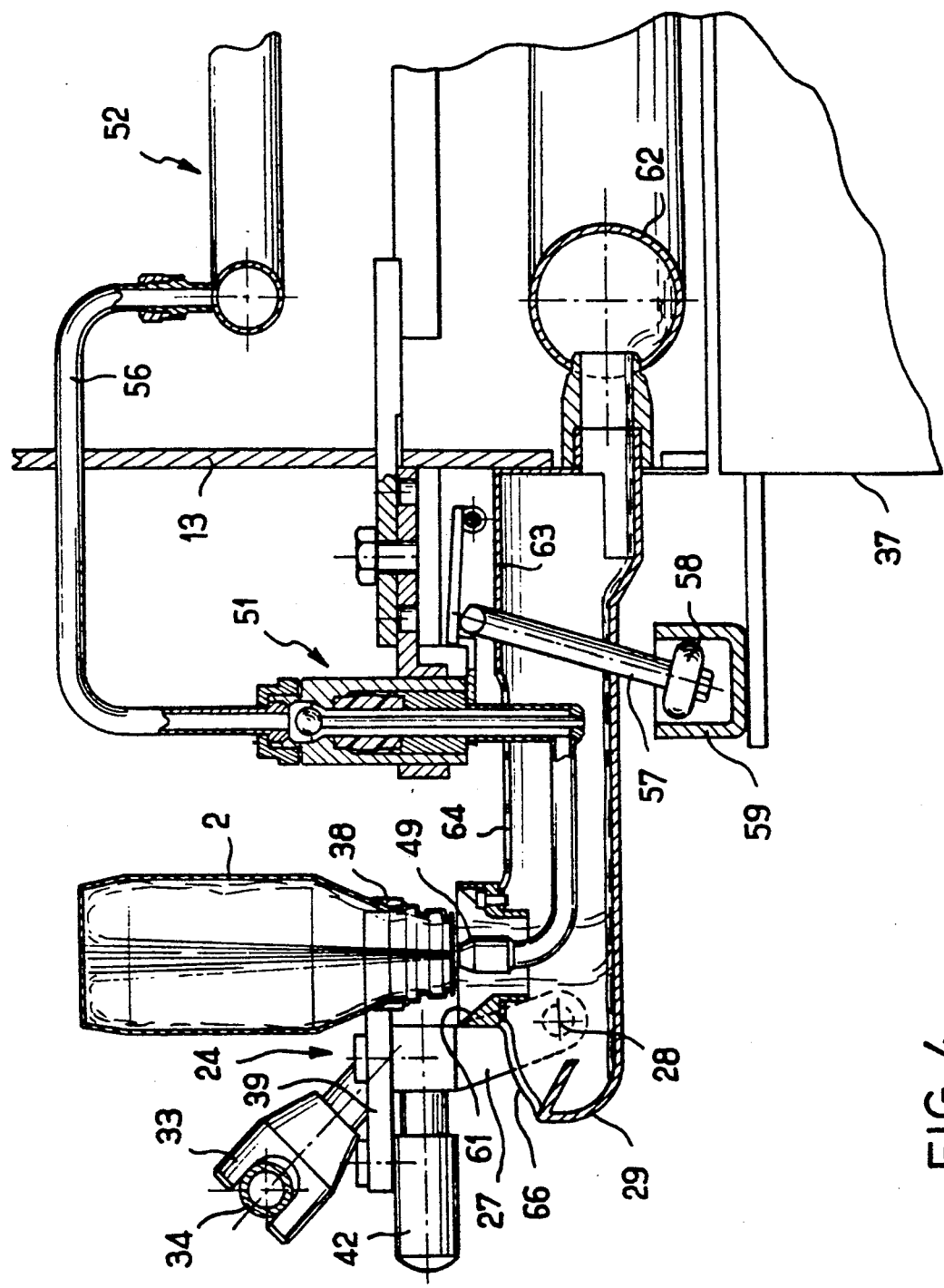
FIG_4

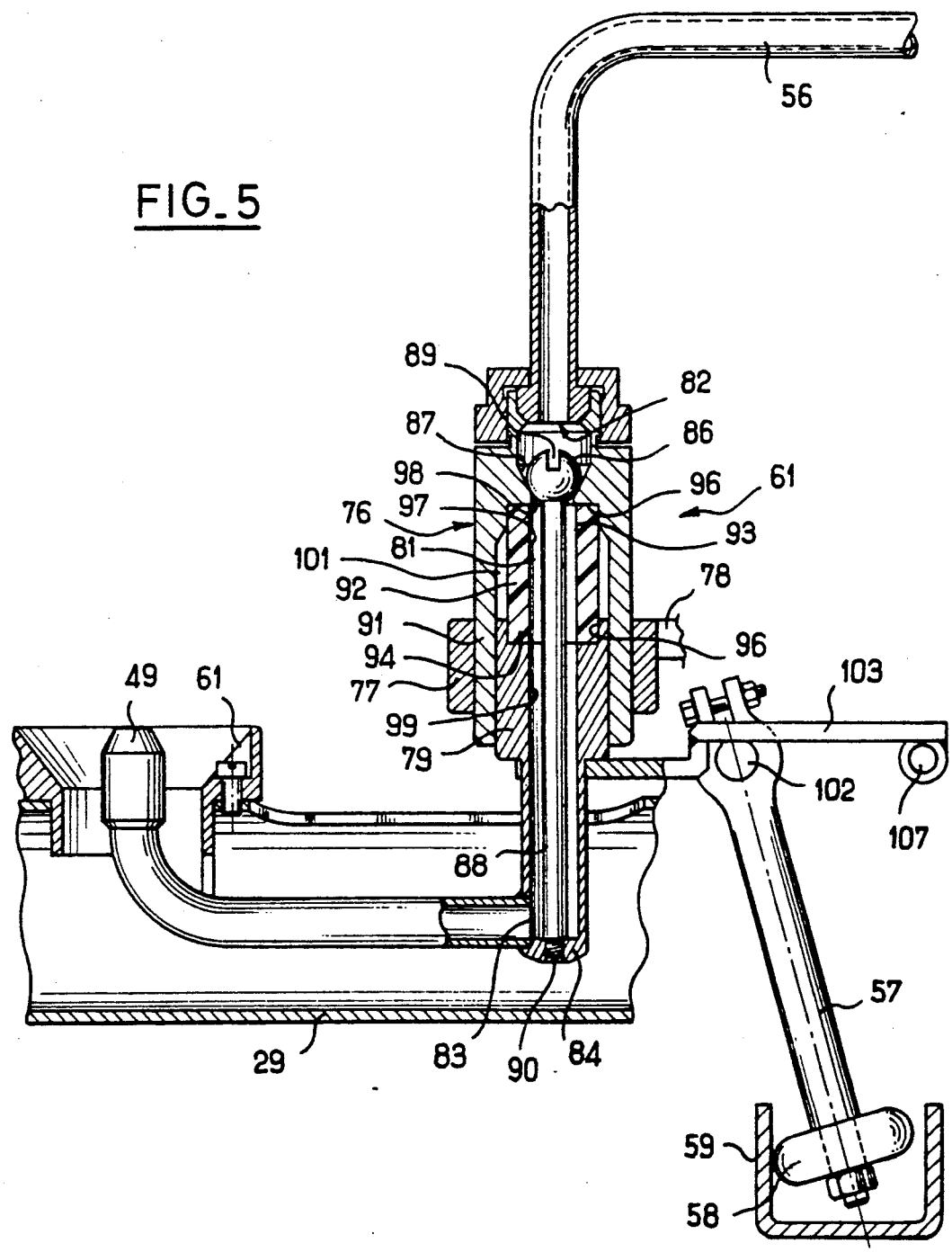
FIG_5

FLOW CONTROL DEVICE

The present invention relates to a flow control device capable of operating as a stopcock, as a delivery regulating valve, or else as a clack valve, for example a nonreturn valve.

Taps or valves are known in which a ball is held captive between two half-bodies and can be applied against a seat formed on one of the half-bodies through the action of a return spring, or can be moved away from said seat in order to permit a flow through the body through the action of the pressure of the fluid or else through the action of a control means.

These known taps have the disadvantage of having in their interior numerous recesses in which deposits can be formed. These deposits may be detrimental to the sound operation of the tap, and may also pollute the fluid subsequently flowing through the tap, particularly when said fluid is a food, pharmaceutical or other such substance. In addition, in this type of tap sound operation is no longer achieved when the spring is broken or has lost its original resilient properties, particularly through contact with the fluid flowing through the tap. In cases where the closure means must be controlled from the outside, a dynamic seal must be provided between one of the half-bodies and the control member passing through said half-body with a certain mobility. This dynamic seal has to be replaced periodically, and its presence gives rise to additional recesses in the flow-path of the fluid.

The aim of the invention is therefore to propose a flow control device whose internal flowpath has minimum relief.

According to the invention the flow control device, comprising two half-bodies connected to one another with the interposition of annular sealing means and forming together a body defining a flowpath between two openings, each of which is associated with one of the half-bodies, while a closure means is mounted in the flowpath for movement between a closed position, in which it is applied against a seat formed on a first half-body, and an open position in which it is distant from said seat, is characterized in that the closure means is mounted between the seat and the opening of the first half-body and is connected to the second half-body through the annular sealing means, and in that the annular sealing means are axially compressible.

The movements of the closure means are accompanied by corresponding relative axial movements of the two half-bodies relative to one another through variation of the state of compression of the seal between the two half-bodies. There are no longer any specific return means or disadvantages associated therewith. The structure is simplified and its maintenance is facilitated.

An advantageous version of the device according to the invention is provided with means for returning the closure means to the closed position. To serve as such return means, it is advantageous for the axially compressible annular sealing means to be elastically compressible. When this is so, the return means no longer hinder the flow of the fluid and no longer constitute a trap promoting the formation of deposits in the flow control device.

The compressible annular sealing means for effecting the return of the closure means preferably comprise a tubular sleeve defining in its interior a duct connected to an internal duct in each of the half-bodies so as to achieve continuity therewith.

When the flow control device is provided with means for actuating the closure means, these actuating means preferably consist of means for controlling the relative axial position of the two half-bodies.

The flow control device is thus particularly advantageous because the actuating means no longer have to pass through the wall of one or the other half-body in order to be connected to the closure means. There is thus no longer any need for a dynamic seal around a rod actuating the closure means, and thus the corresponding costs of purchase and maintenance, the risks of wear and leaks, and also all the risks of accumulation of deposits in the region of said dynamic sealing means are eliminated.

Other features and advantages of the invention will also emerge from the following description of various non-limitative examples.

In the accompanying drawings:

FIG. 1 is a schematic top view of a rotary roundabout treatment machine according to the invention;

FIG. 2 is a schematic view in axial section of the machine on the line II—II in FIG. 1;

FIG. 3 is a view in elevation, partly in section, of a treatment device of the machine shown in FIGS. 1 and 2, the bottle being in the upright position;

FIG. 4 is a similar view to FIG. 3, but showing the bottle subjected to an injection in the inverted position;

FIGS. 5 and 6 are views in axial section of the central part of the device, at rest and during the injection respectively.

Figure 6:
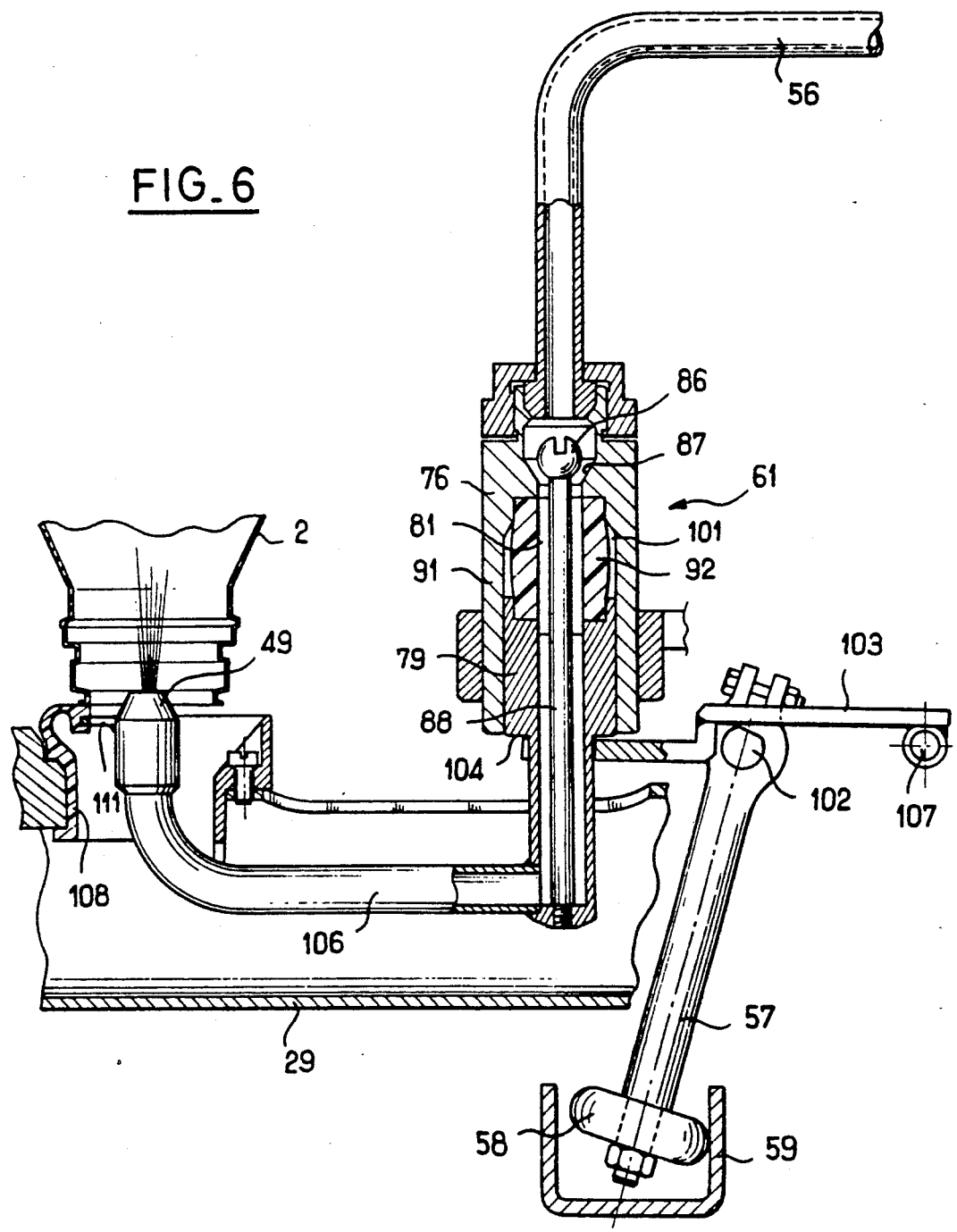

The machine shown in FIGS. 1 and 2 is intended to be inserted in a bottle-treatment chain. It comprises an inlet conveyor 1 receiving the bottles 2 coming from the upstream part of the chain, and an outlet conveyor 3 which passes the bottles 2 to the downstream part of the chain.

Along the inlet conveyor 1 is disposed a spacer screw 4 of known type, which gives the successive bottles 2 a spacing and a speed of passage which are predetermined in such a manner as to synchronize the bottles 2 with compartments 6 formed on the periphery of an inlet star wheel 7. The compartments 6 pass above the conveyor 1 and receive the successive bottles 2 in order to propel them along a semicircular path defined by a guide edge 8 of a guide plate 9. This semicircular path, along which the bottles slide, on their bases, on a floor 11, brings the bottles 2 from the inlet conveyor 1 to bottle treatment devices 12 mounted in crown-like distribution on the outer side wall of a rotary roundabout 13. Along the periphery of the roundabout 13 the treatment devices have a circumferential spacing between one another which corresponds to the space between successive bottles on the star wheel 7.

Through the rotation of the roundabout 13 the treatment devices 12 pass in succession through a bottle gripping station 14, a bottle inversion station 16, an injection station 17, a bottle re-erection and draining station 18, and a station 19 for transferring the treated bottles to an outlet star wheel 21, which is similar to the inlet star wheel 7 and which passes the treated bottles from the transfer station 19 to the outlet conveyor 3 on a semicircular path along which the bottles slide, on their bases, on the floor 11 and follow another curved guide edge 22 of the plate 9.

The outlet conveyors 21 and 3 are preferably physically composed of a single conveyor, above which the plate 9 is fixed.

The machine is protected and soundproofed by peripheral panels 23, at least some of which are transparent and/or can be opened for maintenance and detailed inspection purposes.

As shown in FIGS. 2 to 4, each treatment device comprises a clamp 24, the purpose of which is to grip by its neck the bottle 2 arriving in front of it in the gripping station, and then to handle the bottle during the inversion and re-erection operations, and finally to release the bottle at the transfer station 19.

Each gripper clamp thus comprises a clamp body 26 in the form of a clevis comprising two arms 27 articulated on a substantially horizontal axis 28 common to two opposite sides of a body 29 of the treatment device. The body 29 is fixed to the rotary frame 31 of the roundabout (FIGS. 2 and 3), and it is extended radially towards the outside from the rotary frame 21, in relation to the substantially vertical axis of rotation 32 of the roundabout 13. The axis 28 is situated close to the radially outer end of the body 29. The axis 28 is called the inversion axis, because it is around that axis that the bottles 2 pivot to effect their inversion and re-erection movements. For this purpose the clamp body 26 carries a finger 30 ending in a fork 33, preferably made of plastics material having a low coefficient of friction and good wear-resistance A movement control bar 34 is engaged in the fork 33. As shown in FIG. 1, the movement control bar 34 extends around the roundabout 13 and, as shown in FIG. 3, it is fixed for example by brackets 36 to the fixed frame 37, which is situated under the rotary frame 31 and rotatably supports the latter.

In the representation in FIG. 3 the movement control bar 34 is viewed as if, starting from the section plane of FIG. 3, the observer's viewing direction were not a straight line at right angles to the plane of the drawing, but a curve centered on the axis of rotation of the roundabout. It is thus that the part 34a of the bar 34 which controls the inversion movement of the bottles 2, and which is actually a helix having a circular axis, appears in FIG. 3 as being a semicircle centered on the inversion axis 28.

The clamp 24 comprises two jaws 38 made of a plastic material, each fixed to a rigid branch 39. The two branches 39 are articulated on the body 26 on two axes 41 parallel to one another and at right angles to the inversion axis 28. The jaws 38 are controlled by a slide 42 between a gripping position, in which they are relatively close to one another and can retain between them the neck of a bottle, and a release position, in which they are relatively distant from one another, and enable the neck of a bottle coming from the inlet star wheel 7 to be engaged between them, or to be disengaged from them in order to be taken up by the outlet star wheel 21. The slide 42 is returned by a spring (not shown) to the gripping position (situation shown in FIG. 3) except if a cam 48 pushes it back towards the body 26, which causes the jaws 26 to pass to the release position.

As shown in FIG. 1, the cam 48 is situated only in that region of the periphery of the roundabout 13 in which the gripper jaws of each treatment device have to be moved from the gripping position to the release position (transfer station 19), held in the release position (passage from the transfer station to the gripping station) and then brought back to the gripping position (gripping station 14). Along the remainder of the periphery of the roundabout 13, as also shown at the top in FIG. 6, the return spring 45 holds the slide 42 in the position in which the jaws 38 bear against the neck 2 of a bottle undergoing treatment.

Thus, as illustrated in FIG. 3, each clamp 24 is able to grip a bottle 2 in the upright position under the body 29 and to pivot it 180 degrees around the free end of the body 29 under the control of the control bar 34, in order to bring the bottle into an inverted position (FIG. 4) in which its neck is situated just above a fluid injection nozzle 49. The nozzle 49 is connected by means of a valve 51, fixed to the body 29, to a pressurized supply device 52 which is installed inside the roundabout 13 and which may for example comprise a pump 53 (FIG. 2) delivering into an annular pipe 54 to which are connected all the connections 56 to the valves 51 of all the treatment devices 12 of the machine.

Each valve 51 is controlled by a lever 57 which is movable between a closed valve position, shown in FIG. 3, and an open valve position shown in FIG. 4. The lever carries at its end a roller 58 which is engaged in a U-shaped control rail 59, which is fixed to the fixed frame 37 of the machine and extends around said frame, as can be seen in FIG. 1. The control rail 59 is circular and centered on the axis 32 of the rotary roundabout, except along the injection station 17, in such a manner as to cause each valve 51 in the open position to pass to the injection station 17 and to hold each valve in the closed position along all the other stations of the treatment machine.

Consequently, when a bottle 2 is at the injection station, as illustrated in FIG. 4, the nozzle 49 delivers a jet of fluid into the interior of the inverted bottle 2, through its neck. This fluid strikes the inside wall of the bottle 2 and trickles along the latter before passing out of the bottle 2 through the neck of the latter.

The fluid thus flowing is collected through a funnel 61 which is situated just below the neck of the bottle 2 and which surrounds the nozzle 49 with a certain radial clearance between the outside wall of the nozzle 49 and the inside wall of the funnel 61. The opening defined by the funnel 61 gives access to the interior of the body 29, which constitutes an individual receptacle for the collection of the fluid falling back from the bottle 2.

By the expression "individual receptacle" it is intended to designate a receptacle of relatively small size, allocated to a single treatment device and turning with the roundabout 13 so as to remain under the necks of the bottles 2 undergoing treatment, particularly along the injection station 17.

At its radially inner end the receptacle 29 communicates with an annular collector 62 mounted in the rotary roundabout 13 for the purpose of collecting the liquid falling back from the bottles 2 and coming from all the receptacles 29.

In the example illustrated this fluid is a liquid. It may be a rinsing liquid such as water, which will be conducted from the collector 62 to the drain. It may also be a bottle-coating liquid whose cost is relatively high and which will be conducted from the collector 62 via a filtration and recycling device to the pump 53 (FIG. 2). In a manner not illustrated, the fluid injected by the nozzle 49 may be a gas which it is not desired to discharge in large amounts into the atmosphere, in which case the collector 62 is connected to a suction source.

The receptacle 29 has a top closure 63 in which, in addition to the opening defined by the funnel 61, there are provided an opening 64 in which the base of the valve 51 is engaged, and a drip-collection opening 66. The latter is disposed in the radially outer end of the receptacle 29, that is to say that end of the receptacle 29 which is surrounded by the trajectory of the clamp 24 and of the bottle 2 carried by it between the upright and inverted positions of said bottle. FIG. 3 shows in dot-dash lines a position 2a assumed by the bottle 2 in the course of its return travel from the inverted position to the upright position along the bottle re-erection station 18 shown in FIG. 1. The position 2a, inclined less than 90 degrees relative to the inverted position, promotes the draining of the bottle after the injection undergone along the injection station, and the receptacle 29 collects the product of this drainage through the opening 66.

The valve 51 will now be described in detail with reference to FIGS. 5 and 6.

The valve 51 comprises a stationary half-body 76 having a tubular general shape, which is fixed to the body-receptacle 29 with the aid of a collar 77 and a bracket 78. At one of its ends the stationary half-body 76 is leaktightly connected to the connection 56. The other end of the stationary half-body 76 is shaped as a skirt 91 in which a movable half-body 79 is mounted in an axially sliding manner. The two half-bodies 76 and 79 together form a valve body defining a flowpath 81 between an opening 82 associated with the stationary half-body 76 and bringing the latter into communication with the connection 56, and an opening 83 formed through the side wall of the movable half-body 79, whose end opposite to the stationary half-body 76 is closed by an end wall 84.

The valve 51 also comprises a spherical closure means 86 mounted in the stationary half-body 76 between the opening 82 of the latter and a seat 87 of conical general shape formed on the inside wall of the stationary half-body 76 in such a manner as to widen towards the opening 82, that is to say in the opposite direction to the other half-body. The spherical closure means 86 is rigidly fixed to one end of an axial rod 88, the other end of which is leaktightly screwed into a tapped hole 90 in the end wall 84 of the movable half-body 79. For the purpose of effecting this screwing during the mounting, the closure means 86 is provided on its side facing the opening 82 with a slot 89, into which the end of a screwdriver can be inserted when the attachment to the connection 56 has not yet been made. The rod 88 thus extends through a part of the stationary half-body 76 and through the entire axial length of the movable half-body 79.

Through the sliding of the movable half-body 79 in the terminal skirt 91 of the stationary half-body 76, the closure means 86 is movable between the closed position shown in FIG. 5, in which it bears leaktightly against the seat 87, and an open position shown in FIG. 6, in which it has been moved away from the seat, while the movable half-body 79 is in a retracted position inside the skirt 91.

The valve 51 also comprises means for returning the closure means 86 to the closed position, and sealing means between the two half-bodies 76 and 79. These return means and sealing means consist of a single member, namely a sleeve 92 made of a silicone plastic material, which is mounted around the rod 88 with, between them, an annular space defining a part of the flowpath 81. The sleeve is inserted axially between an annular shoulder 93 on the stationary half-body 76 and an annular shoulder 94 on the movable half-body 79. The sleeve 92 is compressed elastically in the axial direction between the shoulders 93 and 94, which has the effect of causing it to bear leaktightly against each of the two shoulders 93 and 94 and to urge the two half-bodies 76 and 79 axially apart, and therefore to apply the closure means 86 against its seat 87 with a force substantially corresponding to the elastic compressive force of the sleeve in this relative position of the two half-bodies.

Each half-body 76 and 79 has around its shoulder 93 and 94 respectively a centering surface 96 cooperating with the corresponding end of the outside lateral surface of the sleeve 92 in order to center the latter on the general axis of the valve 51. The sleeve 92 has a cylindrical inside surface 97 extending over its entire axial length and having the same diameter as bores 98 and 99 adjoining the sleeve and belonging to the half-bodies 76 and 79 respectively. Said inside surface 97 is thus connected continuously to the bores 98 and 99 in order to give the flowpath, between the closure means 86 and the opening 83, a smooth configuration of annular cross-section, the rod 88 being itself cylindrical with a diameter smaller than the inside diameter of the wall 97 and of the bores 98 and 99.

A clearance 101 is provided around the sleeve 92 between the two centering surfaces 96, in order to enable the sleeve 92 to swell slightly in the outward direction when, as illustrated in FIG. 6, it is axially compressed in order to cause the closure means 86 to pass to the open position.

In the example illustrated the sleeve 92 has an outside surface which is cylindrical and coaxial with its cylindrical inside surface 97, so that the sleeve 92 can be produced by cutting up a single tube made of a silicone plastic material.

In order to bring about the passage of the closure means 86 to the open position against the return action exerted by the sleeve 92, the actuating lever 57 is axially fastened to a cam 102 which selectively effects the displacement of a lever 103, which has an axis 107 fastened to the receptacle 29 and which is supported, at a distance from the axis 107, on a shoulder 104 on the movable half-body 79.

As also shown in FIG. 6, when the half-body 79 is actuated in the direction of the opening of the closure means 86, this gives rise to an upward movement of the nozzle 49, which is rigidly connected to the movable half-body 79 in such a way as to be in leaktight communication with the opening 83. This may cause the nozzle 49 to penetrate slightly into the neck of the bottle 2, and it reinforces the accuracy of the injection.

As shown in a half-view in FIG. 6, it is possible to contemplate the fitting in the funnel 61 of a sealing bellows 108, the movable portion of which is supported by a rigid ring 109 connected to the nozzle 49 by rigid bars 111. When the nozzle 49 rises together with the half-body 79, it applies the bellows 108 leaktightly against the neck of the bottle, as illustrated. This is advantageous when the fluid used is a gas which it is desired to collect in the receptacle 29 by suction.

A pipe 106 connecting the nozzle 49 to the opening 83 extends freely inside the body-receptacle 29.

The valve 51 provides the advantage of having a smooth flowpath 81 which does not encourage the accumulation of deposits, and of not having a dynamic seal for controlling the valve, that is to say of not requiring one of the half-bodies to have, passing leak-tightly through it, a member controlling the closure means.

The operation of the treatment machine will now be explained:

The bottles 2 brought by the inlet conveyor 1 and suitably spaced by the spacer screw 4 are delivered by the inlet star wheel 7 to the successive treatment devices 12. The cam 48 controls the closing of each clamp 24 at the moment when the inlet star wheel 7 has placed a bottle between its jaws.

After the closing of a clamp, the guide bar 34 controls, by its helical region 34a, the gradual inversion of the bottle 2 in question, this inversion being completed at the beginning of the injection station 17 slightly before the control rail 59 effects the opening of the valve 51 and consequently the injection of fluid through the nozzle 49. After the injection the bottle is held for a certain time in the inverted position in order to enable it to drain, and thereafter the control bar 34 effects the re-erection of the bottle along the re-erection station 18 until the bottle is received in one of the compartments of the outlet star wheel 21, whereafter the cam 48 effects the opening of the clamp to enable the bottle to be conducted from the transfer station 19 to the outlet conveyor 3.

Figure 7:
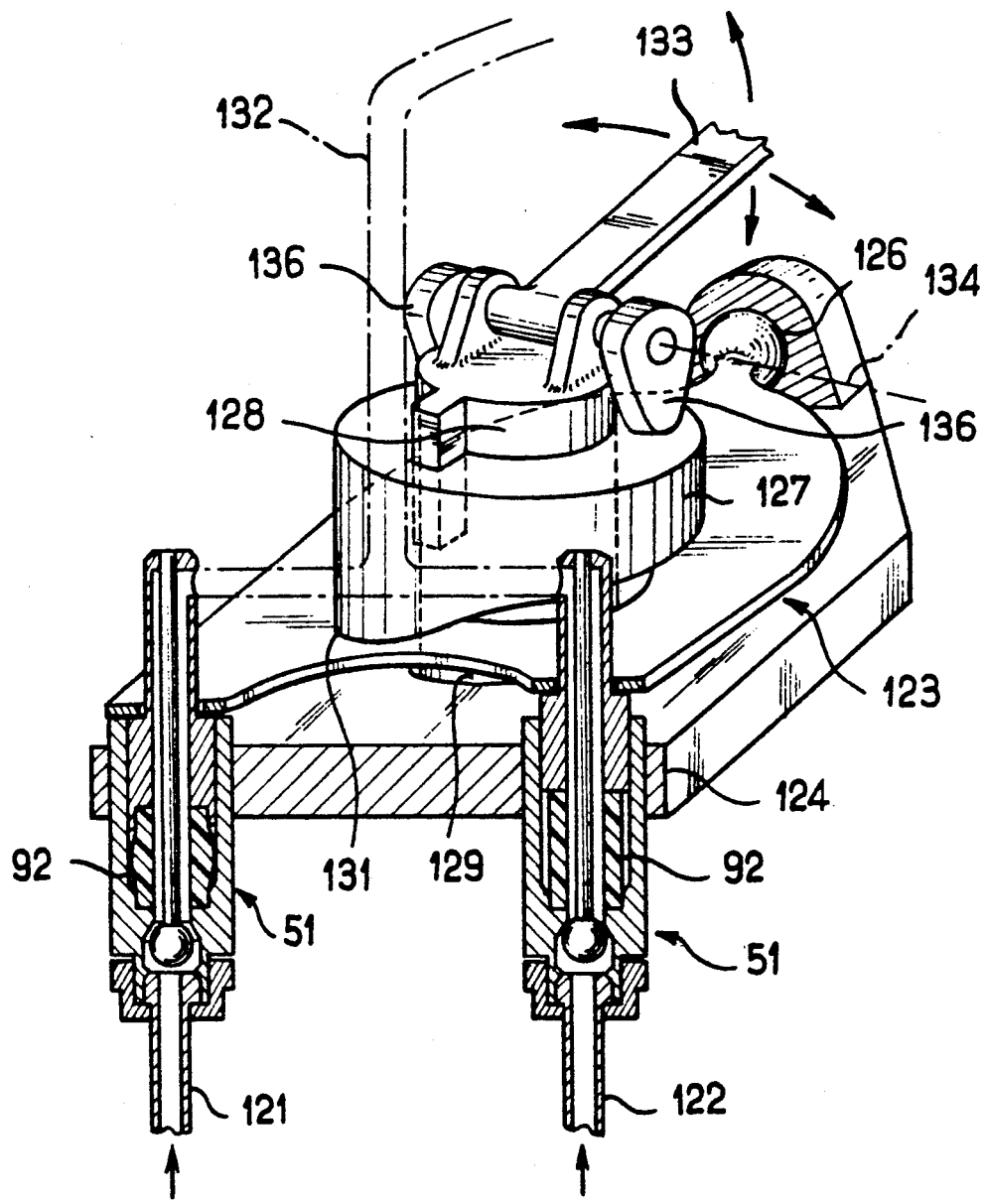
FIG. 7 is a schematic view in perspective, partly in section, of a sanitary mixer utilising two taps according to the invention.

In the example shown in FIG. 7, the sanitary mixer comprises two valves 51 identical to that shown in FIGS. 5 and 6, which are mounted parallel to one another, one of them controlling a cold water pipe 121 and the other a hot water pipe 122. The valves 51 are controlled by one and the same lever 123, which is articulated on a frame 124 by a ball joint 126 situated midway between the two movable half-bodies 79 against which the lever bears.

A cylindrical cam 127 is mounted slidably, without being able to turn, on an axis 128 rotatably supported in a bore 129 in the body 124. The active part of the cam 127 bears against the lever 123 at a point 131 which varies in dependence on the angular position of the axis 128 and which is thus more or less close to one of the half-bodies 79 and less or more close to the other half-body 79, respectively.

If, as illustrated by way of example, the point 131 is close to the valve 51 of the pipe 121, the corresponding sleeve 92 is more compressed than the other and the water supplied to the common outlet tube 132 is relatively cool.

A control handle 133 articulated on the axis 128 on a diametrical axis 134 makes it possible to turn the axis 128 in order thus to regulate the temperature of the water supplied through the outlet tube 132.

The handle 133 is fastened to two opposite flow regulating cams 136, which, when the handle 133 pivots about its diametrical axis 134, drive the cylindrical cam 127 to a greater or lesser extent towards the lever 123, in such a manner as to compress, conjointly, the two sleeves 92 to a greater or lesser extent in order to regulate the flow without substantially varying the temperature of the mixture.

I claim:

1. In a flow control device comprising two half-bodies (76, 79) connected to one another with the interposition of annular sealing means (92) and forming together a body defining a flowpath (81) between two openings (82, 83), each of which is associated with one of the half-bodies, while a closure means (86) is mounted in the flowpath (81) for movement between a closed position, in which it is applied against a seat (87) formed on a first half-body (76), and an open position in which it is distant from said seat; the improvement wherein the closure means (86) is mounted between the seat (87) and the opening (82) of the first half-body (76) and is connected to the second half-body by means (88) that passes through the annular sealing means (92), the annular sealing means (92) being axially compressible and being a hollow cylindrical sleeve having sufficient elasticity when axially compressed to return the closure means to the closed position.

2. Device according to claim 1, characterized in that an inside diameter of the sleeve (92) is equal to an inside bore diameter provided in each of the half-bodies (76, 79) on each side of the sleeve (92) in order to define the flowpath (81).

3. Device according to claim 1 characterized in that the sleeve (92) is of silicone.

4. Device according to claim 1 characterized in that the closure means (86) is connected to said second half-body (79) by a rod (88) extending substantially axially in the flowpath (81).

5. Device according to claim 1 characterized in that the closure means (86) is spherical.

6. Device according to claim 1 characterized in that the closure means carries on its face turned towards the opening of the first half-body a gripping means (89) for a tool permitting the turning of the closure means (86) and its means (88) of connection to the other half-body (79), in order to fix the connection means in paired means (90) carried by the second half-body.

7. Device according to claim 1 characterized in that one of the half-bodies (76) is provided with a skirt (91) surrounding the other half-body (79).

8. Device according to claim 1 characterized in that the means of connection between the closure means (89) and the second half-body (79) is an axial rod (88) fixed to an end wall (84) of the second half-body (79), the opening (83) of the latter being lateral.

9. Device according to claim 1 comprising means for actuating the closure means, characterized in that the means (57, 59, 102, 103) for actuating the closure means are means for controlling the relative axial position of the two half-bodies (76, 79).

10. Device according to claim 1, wherein said flowpath (81) is outwardly bounded by said sealing means (92).

11. Device according to claim 10, wherein said connection means (88) comprises a rod passing through but spaced radially inwardly from said annular sealing means (92), said flowpath (81) surrounding said rod.

* * * * *